United States Patent [19]
Tomikawa et al.

[11] 3,960,722
[45] June 1, 1976

[54] OIL ADSORBENT

[75] Inventors: Masami Tomikawa; Akiji Tsunoda; Kazuhisa Kaneda; Hideo Ohkawa; Yutaka Mugino, all of Chiba, Japan

[73] Assignee: Idemitsu Kosan Kabushiki Kaisha (Idemitsu Kosan Co., Ltd.), Japan

[22] Filed: Jan. 27, 1975

[21] Appl. No.: 544,301

Related U.S. Application Data

[63] Continuation of Ser. No. 363,389, May 24, 1973, abandoned.

[52] U.S. Cl.................................. 210/36; 210/40; 210/502; 260/2.5 HA; 252/428; 210/DIG. 26
[51] Int. Cl.² ........................................... C02B 9/02
[58] Field of Search ........ 210/36, 40, 502, DIG. 21; 252/428, 430; 260/2.5 HA, 37 R, 37 M, 42.24, 42.46

[56] References Cited
UNITED STATES PATENTS 3,681,237  8/1972  Orban et al............................ 210/40
3,764,527  10/1973  Sohl............................ 210/DIG. 21
3,856,614  12/1974  Susuki et al.................... 260/2.5 HA
3,862,963  1/1975  Hoshi et al.......................... 210/502

FOREIGN PATENTS OR APPLICATIONS 1,192,063  5/1970  United Kingdom.......... 210/DIG. 21

Primary Examiner—Charles N. Hart
Assistant Examiner—Ivars Cintins
Attorney, Agent, or Firm—William J. Daniel

[57] ABSTRACT

An oil adsorbent comprising a plastic material for eliminating oils present in or on the surface of water through adsorption. Said adsorbent is produced by foaming by a physical means polyethylene containing 30–80% by weight of at least one inorganic calcium compound selected from the group consisting of calcium sulfite and calcium carbonate, to prepare a foamy substance having a density of 0.06–0.10 g/cc and then shaping the substance to have a network structure.

6 Claims, 2 Drawing Figures

OIL ADSORBENT

This is a continuation of Ser. No. 363,389, filed May 24, 1973, now abandoned.

BACKGROUND OF THE INVENTION

This invention relates to a new oil adsorbent capable of effectively eliminating oils floating on the surface of water or existing as droplets in water through adsorption.

Petroleum refining plants and petrochemical plants discharge industrial effluents containing a variety of waste oils. When such industrial effluents are thrown away into river and sea, a problem of environmental pollution is caused by waste oils. Accordingly, perfect elimination of oils is required for discharge of such industrial effluents from the plants in the field of petroleum industry.

In some cases, heavy oil is inadvertently discharged or leaked by mismanagement from tankers anchored in harbors. Such heavy oil has also to be eliminated as it damages seriously the harbor environment.

As the means for removing oils from water contaminated with the oils, there have been known, for example, a method using an oil separator to separate the contaminated water into an oily phase and an aqueous phase, a method for biologically decomposing oils with an active sludge, etc. As one of these known method, there is a method wherein an oil-absorbing substance as oil adsorbent is brought into contact with oil-contaminated water and then the oil adsorbent in which oils have been absorbed is separated from water. The method using an oil-absorbing substance as oil adsorbent has such a merit that it can remove not only oils floating on the surface of water but also oils present in water as droplets.

In this method, however, it is important what is utilizable as oil adsorbent. The oil adsorbent has to possess excellently high oil absorbability with a negligible water absorbability to adsorb oils effectively from water. As this material is used in a large amount, it also has to be less expensive and easily disposable, for example, by incineration treatment after the use for oil-adsorbing treatment. Heretofore used as such oil adsorbent are sawdust, straw-mat, unwoven cloth, polyurethane foam and other porous inorganic substances. However, all of these substances have low efficiency in catching oils from water and so are not satisfactory for practical use.

BRIEF SUMMARY OF THE INVENTION

It is an object of this invention to provide materials which have high oil adsorbability with negligible water adsorbability and are easily disposable by incineration.

It is another object of this invention to provide an oil adsorbent capable of effectively removing oils in water by adsorption.

It is still another object of this invention to provide an oil adsorbent produced by foaming by a physical means polyethylene containing 30–80% by weight of an inorganic calcium compound and then shaping the foam to have a network structure.

Other objects of this invention will become apparent from the following description and the attached drawings.

DETAILED DESCRIPTION OF THE INVENTION

Figure 1:
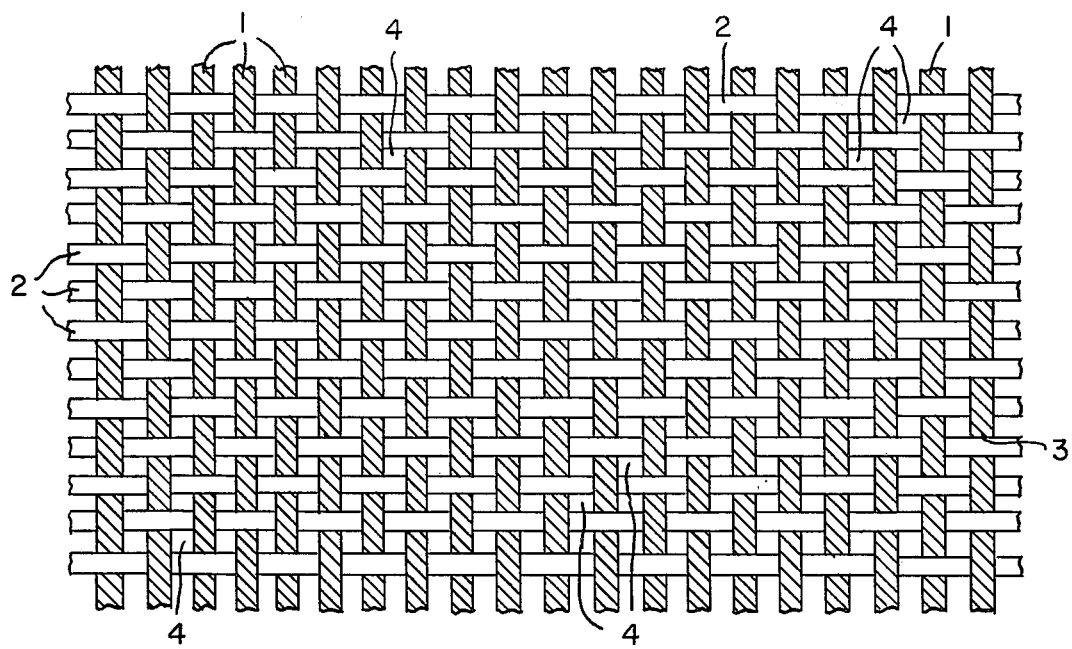
FIG. 1 is a partial plane view showing one form of the oil adsorbents of this invention.

The oil adsorbents of this invention can be produced from a resin of polyethylene series and an inorganic calcium compound by converting the starting materials according to a physical foaming means into a foamy substance and shaping it to have a network structure.

Resins of polyethylene series used as one of the starting materials of this invention include, in addition to polyethylene itself, copolymers and blends of polyethylene so far as they contain polyethylene predominantly. Examples of such resins are high pressure method polyethylene, ethylene/vinyl acetate copolymer and a bland of moderate pressure method polyethylene and ethylene/vinyl acetate copolymer. As the inorganic calcium compound, there can be mentioned calcium sulfite, calcium sulfate and calcium carbonate. These compounds may be used alone or in mixture of two or more. The inorganic calcium compound is used in the foamy substance in an amount of 30–80% by weight.

In this invention, it is necessary to adopt a physical foaming technique for producing a foamy substance possessing good oil adsorbing activity. Although a chemical bridging foaming technique using a foaming agent and a bridging agent has generally been adopted hitherto for manufacturing foamy materials containing an inorganic filler, this technique is unable to obtain foamy substances possessing the desired oil adsorbing activity. This is probably due to the reason that bridging linkages are formed in the foamy resin obtained according to the chemical bridging foaming technique to damage oil adsorbability seriously.

Below is a detailed description on the production of the oil adsorbent of this invention. A resin of polyethylene series is charged into a mixer such as intermixer or Banbury mixer and heated at a temperature near the softening point of the resin. Such softening point varies according to the sort of resin but is generally within the range of 90°–105°C. An inorganic calcium compound is then added to the softened resin and the mixture is homogeneously mixed whereby the temperature of the mixture is gradually elevated by frictional heat of the mixture. The mixing operation is finished when the temperature of the mixture has reached 130°–170°C.

The resultant milled mixture is then cooled, solidified and crushed to a solid granular material which is then charged into a conventional foam shaping extruder where the material is heated to a melt. A liquidized gas is introduced into the melt under pressure and then the melt is extruded to form a foamy substance.

According to this invention, the resulting foamy substance is shaped into a network product for furnishing it with good oil adsorbability. For this, there are methods using a sheet of the foamy substance, such as a method wherein a sheet of the foamy substance is notched and then stretched, and a method wherein a sheet of the foamy substance is punched to form a network pattern. According to a foam extruding method, however, the product in the form of a rope (rod) is obtained, which can easily be processed to a net. Thus, the use of said foam shaping extruder is especially recommended.

The foamy substance in the form of a rope is shaped into a net by knitting or weaving or by adhesion.

Figure 2:
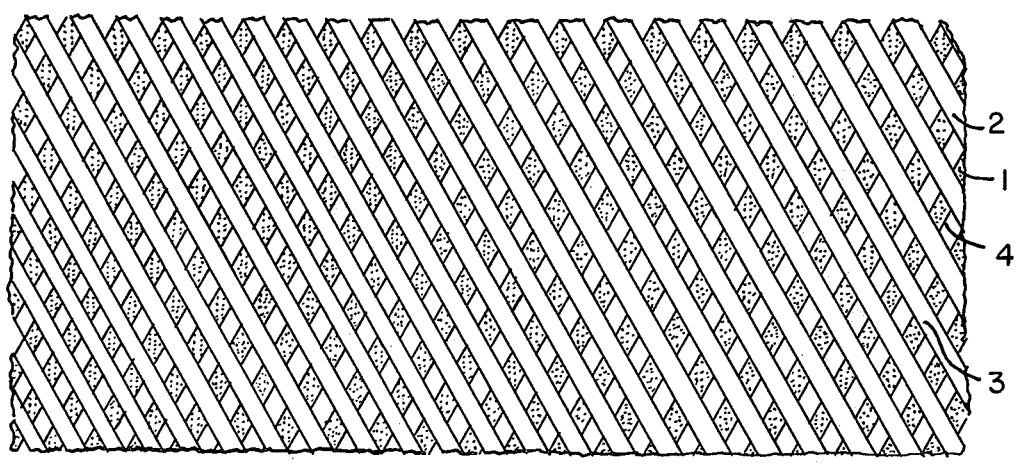
FIG. 2 is a partial plane view showing one example of the oil adsorbents of this invention different in the form from that of FIG. 1.

The network product shown in FIG. 1 is one produced by knitting while that shown in FIG. 2 is one produced by adhesion.

In FIGS. 1 and 2, 1 and 2 are the foamy substances in the form of a rope crossed with each other. The diameter of the ropes is not specifically limited but is usually 1–5 mm. 3 is a crossover and 4 is an interstice in the network structure. The crossover 3 is not bonded by adhesion in FIG. 1, whereas the same is bonded by fusion or adhesion in FIG. 2.

When the network product thus shaped is used as oil adsorbent, oils are not only adsorbed to the product but also kept in the interstices 4. The size of the interstices 4 is usually maintained to 1–2 mm in both longitudinal and transverse directions thereby keeping oils efficiently in the interstices. However, the interstices 4 are not absolutely necessary and the foamy substances in the form of rope 1 and 2 may be intimately contacted with each other to form the product in the form of a strawmat. Accordingly, the network products of this invention involve, in addition to the network product itself, such strawmat product where the ropes 1 and 2 are intimately contacted with each other crosswise.

As the oil adsorbent of this invention uses as constituent a physically foamed substance of a resin of polyethylene series containing an especially selected inorganic calcium compound, the oil adsorbent exhibits excellent oil-capturing effect and efficiently collects oils floating on the surface of water and present in water as droplets.

The oil adsorbent of this invention is effectively applicable to the purifying treatment of industrial effluents containing various oils or sea water contaminated with heavy oil. On removal of oils from water contaminated with the oils by using the oil adsorbent of this invention, the oil adsorbent is piled up to form a multilayer structure through which oil-contaminated water is passed, or alternatively the oil adsorbent is floated on the surface of oil-contaminated water or dipped into the water and then taken up therefrom.

The oil adsorbent of this invention has advantages in the waste treatment: the oil adsorbent is easily combustible and can be incinerated with poor generation of smoke without evolution of any toxic gas, after the use for oil-capturing treatment.

This invention will be illustrated in more detail by way of an example.

EXAMPLE

A given amount of polyethylene pellets (manufactured by the high pressure method; specific gravity: 0.923; melt index: 5.0) was charged into an intermixer provided with a pair of rolls (Model K-1, Hitachi Taura K. K.; capacity: 5 liters) where the pellets were heated externally at about 95°C until they were softened. In this case, the rotating rate of the rolls in the intermixer was kept at 40 rpm. A given amount of an inorganic calcium compound was then added to the heated polyethylene and milling of the mixture was continued whereby the temperature of the mixture being milled was gradually elevated with the lapse of time. When the temperature of the milled mixture reached about 150°C, the milling operation was stopped and the resulting milled mixture was taken out from the intermixer, cooled until the mixture was solidified and then crushed to form a granular material.

The granular material was then fed to a 50 mm $\phi$ extruder where the material was heated at three stages. A liquidized gas was introduced into the heating zone at the second stage and the content was extruded as a foamy substance in the form of a rope having a diameter of 2 mm.

The foaming conditions in this were as follows:
Heating temperature
The first heating zone : 130°–150°C
The second heating zone: 150°–190°C
The third heating zone : 100°–120°C
Feed rate of the granular material: 10 kg/hour
Liquidized gas: Liquidized butane
Pressure supplied by the liquidized gas: 25–30 kg/cm$^2$ Next, the resulting foamy substance in the form of a rope was shaped into a network structure shown in FIG. 2 by fusion. In this case, the interval between the parallelly arranged ropes was 1 mm and the thickness of the crossover was 3 mm.

The resulting network product was tested to determine its performance as oil adsorbent. The results of the test is shown in the following table with relation to the constituents.

The test to determine oil adsorbing activity was carried out in the following manner and evaluation of the oil adsorbing activity was obtained by calculating the amount of oils (g/cm$^3$) adsorbed to a unit volume of the test piece.

Testing Method:

On the surface of 280 ml of sea water were floated 20 ml of an oil (Heavy Oil B, produced by Idemitsu Kosan K. K.). A test piece having a structure and a size as shown in the following table was floated on the oil-contaminated sea water for 10 minutes, drawn from the sea water, hung perpendicularly for 30 seconds to allow excess amounts of the oil and sea water to drop. The weight of the test piece and the loss of sea water were then measured and the amounts of the oil adsorbed and the sea water adsorbed per test piece were calculated according to the equations given below.

Amount of oil adsorbed (g)
= [Weight of test piece after test (g)]
− [Weight of test piece before test (g)
+ Amount of sea water adsorbed (g)]

Amount of sea water adscrbed (g)
= Loss in amount of sea water after test (g)

| | Oil adsorbent | | Test piece | | Results of test | | |
|---|---|---|---|---|---|---|---|
| Exp. No. | Constituents | Density (g/cm$^3$) | | Size (mm) | Amount of water absorbed (g) | Oil (g) | Amount absorbed (g/cm$^3$) |
| 1 | Pe*$^5$/CaSO$_3$ (90/10*$^2$) | 0.065 | Network | 100 × 100 × 3 | 1.0 | 4.10 | 0.137 |
| 2 | " (80/20) | 0.150 | " | " | " | 4.50 | 0.0150 |
| 3 | " (70/30) | 0.075 | " | " | " | 4.72 | 0.157 |
| 4 | " (60/40) | 0.080 | " | " | " | 4.76 | 0.159 |
| 5 | " (50/50) | 0.085 | Strawmat*$^4$ | " | " | 4.70 | 0.157 |
| 6 | " (40/60) | 0.090 | Network | " | " | 4.80 | 0.160 |
| 7 | PE/CaSO$_3$ (60/40) | 0.083 | " | " | " | 4.75 | 0.158 |
| 8 | " (40/60) | 0.092 | " | " | " | 4.78 | 0.159 |

| Exp. No. | Oil adsorbent Constituents | Density (g/cm³) | Test piece | Size (mm) | Amount of water absorbed (g) | Oil (g) | Amount absorbed (g/cm³) |
|---|---|---|---|---|---|---|---|
| 9 | PE/CaSO₄ (60/40) | 0.084 | '' | '' | '' | 4.75 | 0.158 |
| 10 | '' (40/60) | 0.093 | '' | '' | '' | 4.79 | 0.160 |
| 11*¹ | Polypropylene | 0.100 | Bandle | 100 × 100 × 9.6 | 2.0 | 1.26 | 0.013 |
| 12*¹ | Strawmat | — | Strawmat | 100 × 100 × 9.0 | 18.0 | 3.24 | 0.036 |
| 13*¹ | Polyethylene foam | 0.037 | Plate | 100 × 100 × 20 | 2.0 | 1.02 | 0.0051 |
| 14*¹ | Soft polyurethan | 0.021 | '' | 100 × 100 × 20 | '' | 3.79 | 0.019 |
| 15*¹ | Chemically crosslinked foam*³ | 0.150 | '' | '' | '' | 0.48 | 0.00024 |

Remarks:
*¹Comparative Example
*²Weight ratio
*³Polyethylene containing 60% by weight of CaSO₃ is shaped under foaming condition by using a foaming agent and a bridging agent.
*⁴Foamy substances in the form of rope is knitted to form a strawnet.
*⁵PE stands for polyethylene From the results shown in the table, it is noted that the network products of this invention shaped by a physical foaming means are all excellent in oil capturing activity.

What is claimed is:

1. A material for absorbing oil from oil-contaminated water comprising an openwork assembly of elongated strands in intimate contact, said strands having a diameter of about 1–5 mm and being formed of a flexible foam comprising a physically foamed mixture consisting essentially of about 20–70% of a non-crosslinked polyethylene resin and distributed uniformly through said resin about 80–30% of inorganic calcium compound particles, said percentages being by weight.

2. The oil-absorbent material of claim 1 wherein said strand assembly is a substantially reticulated network.

3. The oil-absorbent material of claim 2 wherein the size of the mesh in said network is about 1–2 mm.

4. The oil-absorbent material of claim 1 wherein said calcium compound is at least one of calcium sulfite, calcium sulfate or calcium carbonate.

5. The oil-absorbent material of claim 1 wherein said foam has a density below about 0.10 g/cc.

6. A method of removing oil from oil-contaminated water comprising the step of contacting said water with the absorbent material of claim 1.

* * * * *

UNITED STATES PATENT AND TRADEMARK OFFICE
CERTIFICATE OF CORRECTION

PATENT NO. : 3,960,722
DATED : June 1, 1976
INVENTOR(S) : Masami Tomikawa et al

It is certified that error appears in the above-identified patent and that said Letters Patent are hereby corrected as shown below:

In the Heading, add the following:

-- Foreign Application Priority Data

May 25, 1972    Japan .................... 47-52076 --.

Signed and Sealed this

Tenth Day of August 1976

[SEAL]

Attest:

RUTH C. MASON
*Attesting Officer*

C. MARSHALL DANN
*Commissioner of Patents and Trademarks*